United States Patent
Gerosa et al.

(10) Patent No.: US 8,023,505 B2
(45) Date of Patent: Sep. 20, 2011

(54) CIRCUIT EMULATION SERVICE METHOD AND TELECOMMUNICATION SYSTEM FOR IMPLEMENTING THE METHOD

(75) Inventors: Marzio Gerosa, Milan (IT); Thomas Blondel, Vimercate (IT); Giuseppe De Blasio, Rome (IT)

(73) Assignee: Alcatel Lucent, Paris (FR)

( * ) Notice: Subject to any disclaimer, the term of this patent is extended or adjusted under 35 U.S.C. 154(b) by 49 days.

(21) Appl. No.: 12/239,157

(22) Filed: Sep. 26, 2008

(65) Prior Publication Data
US 2009/0141629 A1 Jun. 4, 2009

(30) Foreign Application Priority Data
Sep. 28, 2007 (EP) .................................... 07291183

(51) Int. Cl.
*H04L 12/66* (2006.01)
(52) U.S. Cl. ........ 370/389; 370/356; 370/474; 370/476; 370/477; 370/392
(58) Field of Classification Search .................. 370/389, 370/392, 356, 395.1, 465–467, 474, 476, 370/477
See application file for complete search history.

(56) References Cited

U.S. PATENT DOCUMENTS

| | | | |
|---|---|---|---|
| 6,813,259 B1 * | 11/2004 | Kumar et al. | 370/338 |
| 6,870,813 B1 | 3/2005 | Raza | |
| 2002/0146000 A1 * | 10/2002 | Jonsson et al. | 370/352 |
| 2003/0172257 A1 | 9/2003 | Greenblat | |
| 2006/0075134 A1 * | 4/2006 | Aalto et al. | 709/238 |
| 2007/0147426 A1 * | 6/2007 | Sharma et al. | 370/469 |
| 2008/0025312 A1 * | 1/2008 | Kuppuswamy et al. | 370/392 |
| 2009/0147804 A1 * | 6/2009 | Wang et al. | 370/476 |

FOREIGN PATENT DOCUMENTS
EP 1176774 A2 1/2002
* cited by examiner

*Primary Examiner* — Huy D Vu
*Assistant Examiner* — Maria L Sekul
(74) *Attorney, Agent, or Firm* — Sughrue Mion, PLLC

(57) ABSTRACT

It is disclosed a method for implementing a circuit emulation service through a packet-switched network, wherein the packet-switched network cooperates with a first interface and a second interface suitable to connect a first user and a second user, respectively, to the packet-switched network. The method comprises: a) at the first interface, receiving a TDM flow from the first user; b) converting the TDM flow in packets formatted according to the circuit emulation service, wherein at least one of the packets comprises a header in turn comprising a redundant field; c) compressing the header into a compressed header by processing the redundant field, and forming a compressed packet comprising the compressed header; d) transmitting the compressed packet through the packet-switched network to the second interface.

9 Claims, 6 Drawing Sheets

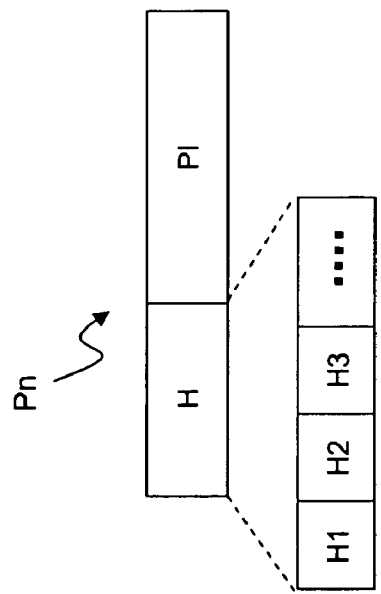
Figure 5
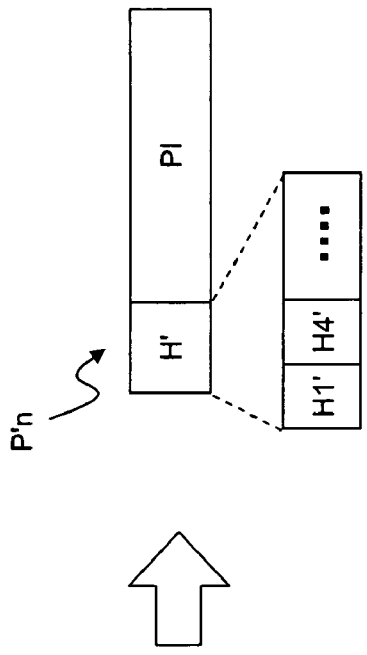
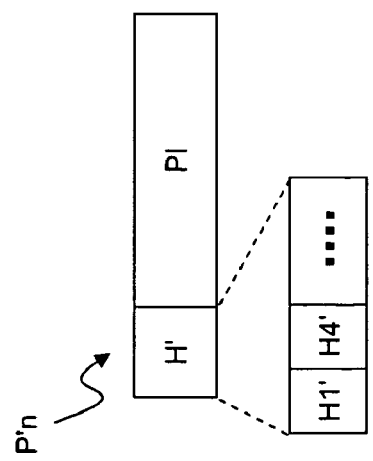
Figure 6
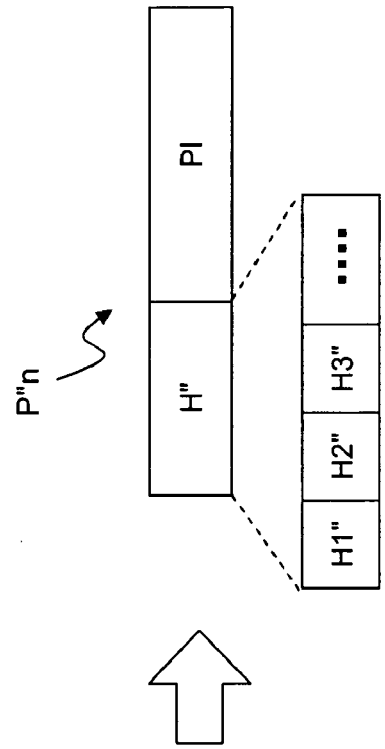

CIRCUIT EMULATION SERVICE METHOD AND TELECOMMUNICATION SYSTEM FOR IMPLEMENTING THE METHOD

TECHNICAL FIELD

The present invention relates to the field of telecommunication networks. In particular, the present invention relates to a method for implementing a circuit emulation service. Further, the present invention relates to a telecommunication system configured to implement such a method.

BACKGROUND ART

It is known that, in a telecommunication network, traffic exchanged by users may be transported either by a circuit-switch mechanism or a packet-switch mechanism.

In a circuit-switched network, a circuit connecting two users wishing to exchange traffic is allocated within the network. Such a circuit is then used exclusively for transporting traffic exchanged by such two users in the form of synchronous or plesiochronous TDM (Time Division Multiplexing) traffic flows. When the two users stop exchanging traffic, the circuit is de-allocated. Exemplary circuit-switched networks are the PDH networks and the SDH or SONET networks.

In a packet-switched network, traffic generated by each user is split into packets. Each packet is then tagged with a destination address and is independently routed span-by-span according to its destination address, until it reaches the destination user. At the destination user, packets are sorted and the original content of the traffic is recovered. Exemplary packet-switched networks are the Ethernet networks and the MPLS (Multi-Protocol Label Switching) networks.

Recently, the so-called "circuit emulation services" are becoming more and more widespread. Such circuit emulation services allow to transport TDM traffic flows (e.g. synchronous SDH flows) exchanged by two users (e.g. two SDH networks) by means of a packet-switched network (e.g. an Ethernet network) "emulating" the allocation of a circuit. In other words, the two users exchange traffic in form of TDM traffic flows without realizing that, actually, such TDM traffic flows are not transported by a circuit, but they are transported in form of packets by a packet-switched network. Exemplary circuit emulation services are the PWE3 (PseudoWire Emulation Edge-to-Edge), the "TDM over MPLS" and the CESo-ETH (Circuit Emulation Service over Ethernet).

The implementation of a circuit emulation service for connecting two users typically requires to connect each of the two users to the packet-switched network by means of a respective interface which provides an interworking function between the TDM traffic flows and the packet-switching service supported by the packet-switched network.

In particular, in the direction entering the packet-switched network, each interface receives a TDM traffic flow from its respective user, it converts such a TDM traffic flow into a packet sequence and it transmits the packet sequence towards the other interface through the packet-switched network. Further, in the direction exiting the packet-switched network, each interface receives a further packet sequence from the other interface through the packet-switched network, it processes the further packet sequence thus recovering a further TDM traffic flow, and it transmits the further TDM traffic flow to its respective user.

Converting the TDM traffic flow in a packet sequence typically requires splitting the TDM traffic flow into portions of a predefined size and inserting each portion into the payload of a respective packet. Then, for each packet, a respective header is generated.

For instance, the standard MEF8 by the Metro Ethernet Forum, October 2004, defines the above mentioned CESo-ETH service. In particular, the standard MEF8, par. 6, describes to split the TDM traffic flow into portions, to insert each portion into the payload of an Ethernet packet, and to generate for each Ethernet packet a 38 byte-long header, in turn comprising: an Ethernet service layer header of 14 bytes, an adaptation header of 8 bytes, an RTP ("Real-time Transfer Protocol") header of 12 bytes and a frame check sequence of 4 bytes.

Similarly, the recommendation Y.1413 by ITU-T, March 2004, defines the above mentioned "TDM over MPLS" service. In particular, the recommendation T.1413, par. 8 and 9, discloses to split the TDM traffic flow into portions, to insert each portion into the payload of an MPLS packet, and to generate for each MPLS packet a 24 byte-long header, in turn comprising: a transport label of 4 bytes, an interworking label of 4 bytes, interworking common indicators with an overall size of 4 bytes and an RTP header of 12 bytes. A 14 byte-long Ethernet service layer header and a frame check sequence of 4 bytes have then to be added.

EP1176774 discloses a method for processing one or more TDMs for communication over IP networks, such as the Internet, including encapsulating ATM cells (packets) using AAL1 cells within UDP over IP frames to provide synchronous bit streams into fixed size cells. This allows for an IP header to be added to the packets, with such packets forwarded to its destination host across the IP network. The destination regenerates the clock, decrypts/strips the IP header and delivers a synchronous bit stream. Furthermore, an adaptive clock is provided for clock transfer across the network. The adaptive clock regenerates the far end T1/E1 receive clock out of the incoming arrival frame rate. Frames arriving from the IP network are stored in a buffer and taken out for TDM stream assembly.

US 2003/172257 discloses systems and methods for implementing: a rings architecture for communications and data handling systems; an enumeration process for automatically configuring the ring topology; automatic routing of messages through bridges; extending a ring topology to external devices; write-ahead functionality to promote efficiency; wait-till-reset operation resumption; in-vivo scan through rings topology; staggered clocking arrangement; and stray message detection and eradication.

SUMMARY OF THE INVENTION

However, the above circuit emulation services have some drawbacks.

Indeed, by referring for instance to the above described CESoETH service, in case the payload size is fixed to e.g. 96 bytes, transporting the 96 payload bytes disadvantageously requires the transmission of 38 additional header bytes. This disadvantageously leads to a very low transport efficiency, which is defined as the ratio between the number of transported payload bytes and the overall number of transmitted bytes (in this example, the transport efficiency is 96/(96+38)=0.71). Although these considerations refer to the CESoETH service defined by the standard MEF8, they could also be applied to any other circuit emulation service, such as the "TDM over MPLS" and the PWE3.

An increase of the transport efficiency could be reached by increasing the payload size of each packet. Indeed, these would allow to transport a higher number of payload bytes by using the same number of header bytes.

However, this solution is disadvantageous since increasing the payload size disadvantageously increases also the transmission latency, i.e. the transmission delay that the payload bytes undergo while they are waiting to be transmitted through the packet-switched network.

For instance, it is noted that when transporting E1 frames by means of a packet emulation service, a packet with a payload of 96 bytes and a header of 38 bytes (i.e. the number of header bytes is equal to about 40% of the number of payload bytes) typically undergoes a transmission latency of about 375 µs, which is an acceptable value. However, as mentioned above, the transport efficiency is very low. The transport efficiency is then increased by increasing to payload size from 96 to 1024 bytes, while keeping constant to 38 the number of header bytes (i.e. the number of header bytes is now equal to about 4% of the number of payload bytes). Although the transport efficiency now has an acceptable value (1024/(1024+38) =0.96), the transmission latency becomes higher than 4 ms. Such a value may be non acceptable, especially when it is summed to other latencies that a packet supporting a circuit emulation service typically undergoes.

Accordingly, it is desired to provide a method and a system for implementing a circuit emulation service, which allows to obtain at the same time both an acceptable transport efficiency and an acceptable transmission latency.

According to a first aspect, the present invention provides a method for implementing a circuit emulation service through a packet-switched network, the packet-switched network cooperating with a first interface and a second interface suitable to connect a first user and a second user, respectively, to the packet-switched network, the method comprising: a) at the first interface, receiving a TDM flow from the first user; b) converting the TDM flow in packets formatted according to the circuit emulation service, wherein at least one of the packets comprises a header in turn comprising a redundant field; c) compressing the header into a compressed header by processing the redundant field and forming a compressed packet comprising the compressed header; d) transmitting the compressed packet through the packet-switched network to the second interface.

Preferably, the method comprises the further steps of: e) at the second interface, receiving the compressed packet; f) decompressing the compressed header into a decompressed header and forming a decompressed packet comprising the decompressed header; g) processing the decompressed packet thus recovering the TDM flow; and h) transmitting the TDM flow to the second user.

Preferably, step d) comprises: d1) receiving the compressed packet at a node of the packet-switched network; d2) decompressing the compressed header into the decompressed header and forming the decompressed packet comprising the decompressed header; d3) performing a packet-switch operation upon the decompressed packet; d4) compressing the decompressed header into the compressed header, and forming the compressed packet comprising the compressed header; and d5) transmitting the compressed packet.

According to preferred embodiments, if the redundant field has a size higher than a minimum size required to represent all the values that the content of the redundant field assumes, step c) comprises replacing the redundant field with a compressed field and mapping the redundant field into the compressed field; and step f) comprises generating a first decompressed field corresponding to the redundant field and demapping the compressed field into the first decompressed field.

According to other preferred embodiments, if the redundant field is univocally determined by a further information included in the at least one of the packets, step c) comprises deleting the redundant field; and step f) comprises generating a second decompressed field corresponding to the redundant field and calculating the second decompressed field according to the further information.

According to other preferred embodiments, if the redundant field has a predefined value, step c) comprises deleting the redundant field; and step f) comprises generating a third decompressed field and setting the third decompressed field to a predefined value.

According to other preferred embodiments, if the redundant field is unused by the packet-switched network and by the second interface, step c) comprises deleting the redundant field; and step f) comprises generating a fourth decompressed field and setting the fourth decompressed field to a further predefined value.

According to a second aspect, the present invention provides a telecommunication system configured to implement a circuit emulation service, the telecommunication system comprising a packet-switched network, a first interface and a second interface cooperating with the packet-switched network, wherein the first interface comprises: a first receiver for receiving a TDM flow from a first user; a packetizer for converting the TDM flow in packets formatted according to the circuit emulation service, wherein at least one of the packets comprises a header in turn comprising a redundant field; a compression module for compressing the header into a compressed header by processing the redundant field, and forming a compressed packet comprising the compressed header; and a first transmitter for transmitting the compressed packet through the packet-switched network.

Preferably, the second interface comprises: a second receiver for receiving the compressed packet; a decompression module for decompressing the compressed header into a decompressed header and forming a decompressed packet comprising the decompressed header; a depacketizer for processing the decompressed packet thus recovering the TDM flow; and a second transmitter for transmitting the TDM flow to the second user.

Preferably, the packet-switched network comprises a node, the node comprising: a third receiver for receiving the compressed packet; a further decompression module for decompressing the compressed header into the decompressed header and forming the decompressed packet comprising the decompressed header; a switch for performing a packet-switch operation upon the decompressed packet; a further compression module for compressing the decompressed header into the compressed header, and forming the compressed packet comprising the compressed header; and a third transmitter for transmitting the compressed packet.

According to a third aspect, the present invention provides a programmable device comprising storage means with a software program recorded thereon, the software program comprising instructions which, when executed on the device, cause the device to carry out the method as set forth above.

BRIEF DESCRIPTION OF THE DRAWINGS

The present invention will become clearer by the following detailed description, given by way of example and not of limitation, to be read with reference to the accompanying drawings, wherein:

FIG. 5 schematically shows the operation of the compression modules shown in FIGS. 2 and 3;

FIG. 6 schematically shows the operation of the decompression modules shown in FIGS. 3 and 4.

DETAILED DESCRIPTION OF PREFERRED EMBODIMENTS OF THE INVENTION

Figure 1:
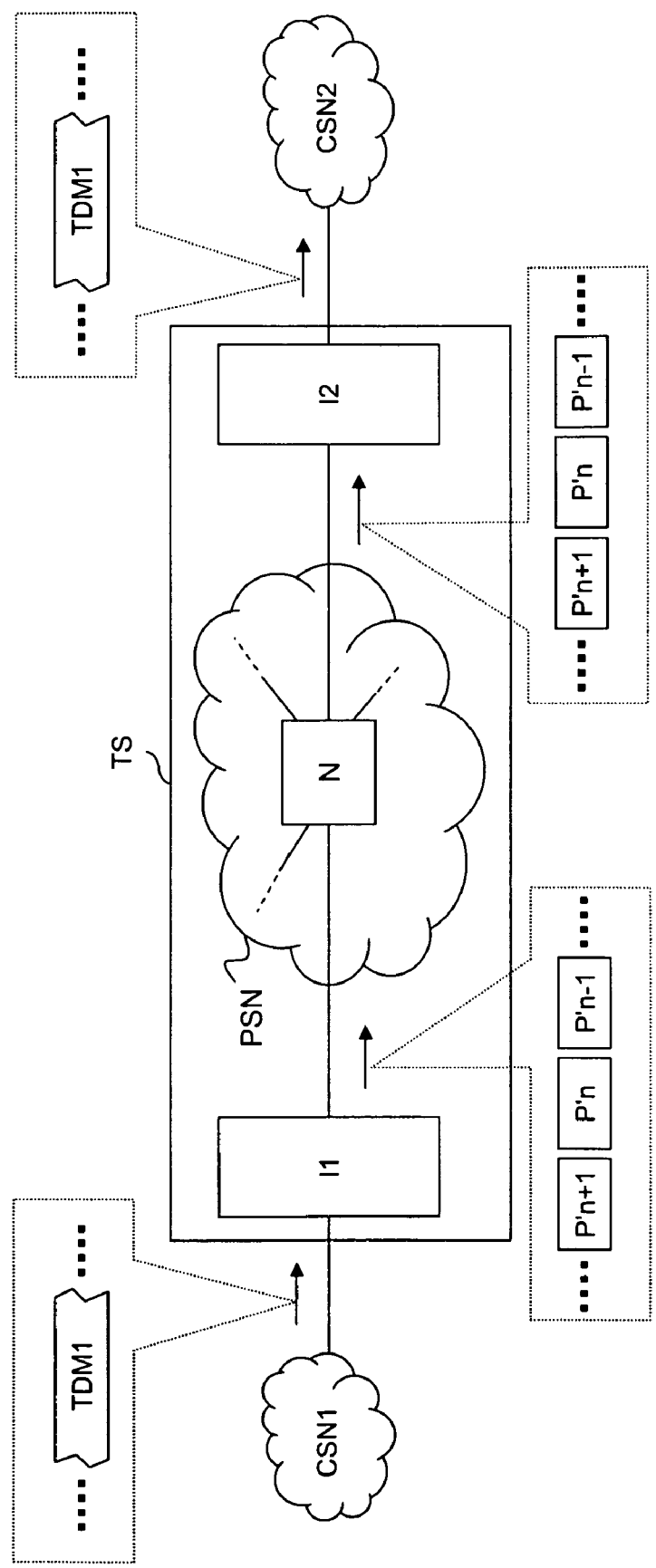
FIG. 1 shows a telecommunication system configured to implement a circuit emulation service according to an embodiment of the present invention.

FIG. 1 schematically shows a telecommunication system TS configured to implement a circuit emulation service, according to an embodiment of the present invention. The telecommunication system TS comprises a packet-switched network PSN, a first interface I1 connected to the network PSN and a second interface I2 connected to the network PSN.

The packet-switched network PSN includes a plurality of nodes capable of routing packets from the first interface I1 to the second interface I2 and vice-versa. For simplicity, FIG. 1 shows a single node N, which is connected both to the first interface I1 and to the second interface I2. The node N is further connected to other nodes of the network PSN, which are not shown in FIG. 1.

A first user capable of transmitting and/or receiving TDM traffic flows is connected to the packet-switched network PSN by means of the first interface I1. By way of example, it is assumed that the first user is a first circuit-switched network CSN1. Further, a second user capable of transmitting and/or receiving TDM traffic flows is connected to the packet-switched network PSN by means of the second interface I2. By way of example, it is assumed that the second user is a second circuit-switched network CSN2.

The operation of the telecommunication system TS will be now briefly described, by referring only to the traffic transmitted from the first circuit-switched network CSN1 to the second circuit-switched network CSN2. Since the structure of the telecommunication system TS is symmetrical, the same consideration also apply to the traffic transmitted in the opposite direction.

The first circuit-switched network CSN1 transmits a TDM traffic flow TDM1 to the first interface I1. The first interface I1 receives the TDM traffic flow TDM1, converts it in a sequence of packets P'n−1, P'n, P'n+1, and transmits such packets P'n−1, P'n, P'n+1 to the node N. The node N, by applying a packet-switching operation, switches the packets P'n−1, P'n, P'n+1 to the second interface I2. Then, the second interface I2 receives the packets P'n−1, P'n, P'n+1 and it processes them thus recovering the TDM traffic flow TDM1. The second interface I2 then transmits the TDM traffic flow TDM1 to the second circuit-switched network.

Figure 2:
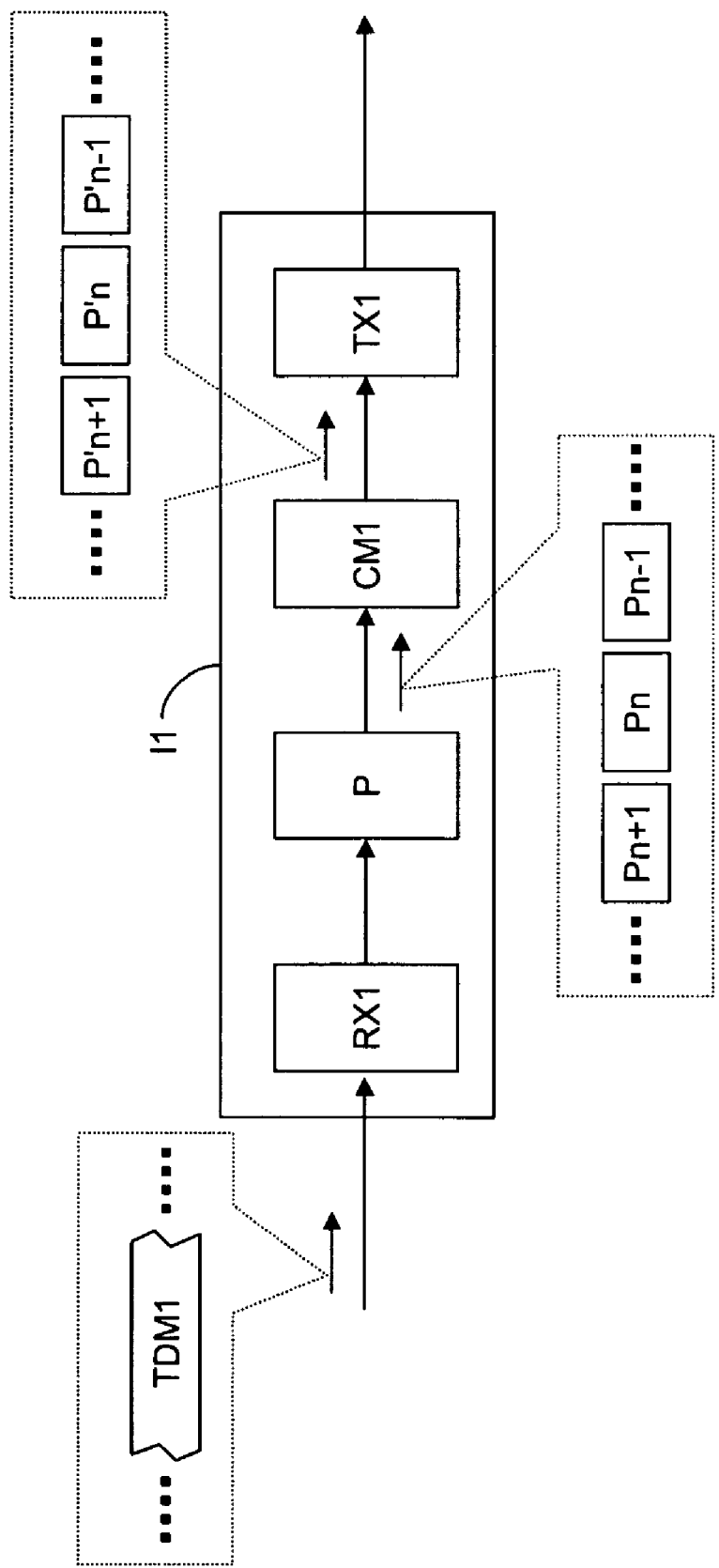
FIG. 2 shows in further detail the structure of the first interface of the telecommunication system of FIG. 1.

FIG. 2 shows in further detail the structure of the first interface I1. FIG. 2 only shows the modules suitable to process traffic transmitted from the first circuit-switched network CSN1 to the second circuit-switched network CSN2. For clarity of the Figure, the modules suitable to process traffic transmitted in the opposite direction are not shown in FIG. 2.

Preferably, the first interface I1 comprises a receiver RX1, a packetizer P, a compression module CM1 and a transmitter TX1.

A packetizer is in charge of converting TDM flow into packets. A typical component for a packetizer may be any digital programmable device such as for example the so-called Field Programmable Gate Array (FPGA) or a so-called Network Processor including a software that executes the packetization.

A compression module is in charge of compressing certain portions of the packet. In the context of the present description, a compression module is in charge of compressing the header of the packet as will described in further detail below. A typical component for a compressor may be any digital programmable device such as for example the so-called Field Programmable Gate Array (FPGA) or a so-called Network Processor including a software that executes compression.

Preferably, when the first interface I1 receives the TDM traffic flow TDM1 through the receiver RX1, the packetizer P splits it into packets Pn−1, Pn, Pn+1 according to a format complying with a standard or recommendation defining the circuit emulation service to be implemented. For instance, the packetizer P may operate according to the above cited standard MEF8 defining the CESoETH service, the above cited recommendation Y.1413 defining the "TDM over MPLS" service, and so on.

FIG. 5 shows by way of example the structure of the packet Pn generated by the packetizer P. The packet Pn comprises a header H and a payload Pl. For instance, if the packet Pn is generated according to the above standard MEF8 (i.e. the circuit emulation service to be implemented is the above CESoETH service), the header H has a size of 38 bytes. The payload Pl may have a size e.g. of 96 bytes.

The header H generated by the packetizer P typically comprises at least one redundant field. In the following description and in the claims, the expression "redundant field" refers to a field of the header H having at least one of the following features:

i) its size is higher than a minimum size required to represent all the values that the content of the field typically assumes;

ii) its content is univocally determined either by the content of another field of the header H, or by the content of the payload Pl, or by the standard/recommendation defining the circuit emulation service to be implemented (i.e. its content has a predefined value);

iii) its content is used neither by the nodes of the packet-switched network PSN for routing the packet Pn towards the second interface I2, nor by the second interface I2 for recovering the TDM traffic flow.

Further, in the following description, the expression "non redundant field" refers to a field of the header H which has none of the above features i), ii) and iii). In the definition of feature ii), the another field may be either a non-redundant field or another redundant field of the header H.

By way of example, the header H of the packet Pn shown in FIG. 5 comprises a redundant field H1 having feature i), a redundant field H2 having feature ii) and a redundant field H3 having feature iii). In the following, by way of example, it is assumed that the content of the redundant field H2 is univocally determined by the content of the redundant field H1. For clarity, the other fields (either redundant or non redundant) of the header H are not shown in FIG. 5.

According to embodiments of the present invention, upon reception of the packet Pn from the packetizer P, the compression module CM1 processes the header H of the packet Pn, thus generating a compressed header H'. More particularly, the compression module CM1 preferably performs at least one of the following operations:

replacing the redundant field H1 with a compressed field H1' whose size is lower than the size of H1, and mapping the content of the redundant field H1 into the compressed field H1';

deleting the field H2;

deleting the field H3.

Further, preferably, the compression module CM1 generates a compression header check sequence and inserts it in a further field H4' of the compressed header H'.

The compression module CM1 then builds a compressed packet Pn' corresponding to the packet Pn, wherein said compressed packet Pn' is preferably formed by the compressed header H' and the payload Pl, as shown in FIG. 5.

Finally, the transmitter TX1 transmits the compressed packets P'n−1, P'n, P'n+1 to the node N.

Figure 3:
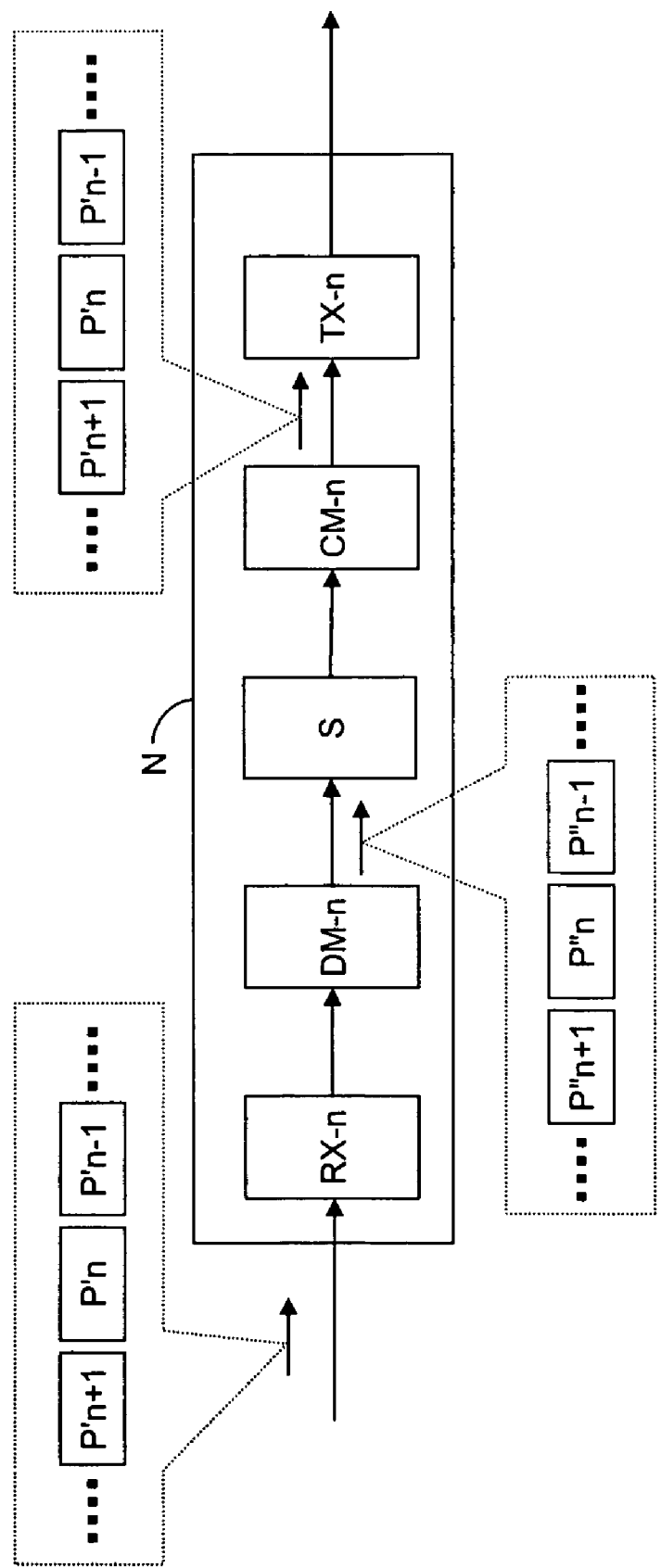
FIG. 3 shows in further detail the structure of the node of the packet-switched network of FIG. 1.

FIG. 3 shows in further detail the structure of the node N. FIG. 3 only shows the modules which are suitable to process compressed packets P'n−1, P'n, P'n+1 transmitted from the first interface I1 to the second interface I2. For clarity of the Figure, modules suitable to process other packets received by the node N are not shown in FIG. 3.

Preferably, the node N comprises a receiver RX-n, a decompression module DM-n, a switch S, a compression module CM-n and a transmitter TX-n.

Preferably, when the receiver RX-n receives the compressed packets P'n−1, P'n, P'n+1 from the first interface I1, the decompression module DM-n processes each compressed packet P'n−1, P'n, P'n+1 thus generating a corresponding decompressed packet P"n−1, P"n, P"n+1.

The operation of the decompression module DM-n will be now described in detail by referring only to the compressed packet P'n, which is shown in FIG. 6.

As shown in FIG. 6, the decompression module DM-n processes the compressed header H' of the compressed packet P'n, thus generating a decompressed header H". Preferably, the decompressed header H" is formatted similarly to the header H generated by the packetizer P at the first interface I1, i.e. it comprises fields which correspond to the fields of the header H. In particular, the decompressed header H" generated by the decompression module DM-n has a field H1" corresponding to the redundant field H1, a field H2" corresponding to the redundant field H2 and a field H3" corresponding to the redundant field H3. The other fields of the decompressed header H" are not shown in FIG. 6.

According to preferred embodiments of the present invention, the decompression module DM-n generates the content of the field H1" by performing a demapping of the content of the compressed field H1', opposite to the mapping performed by the compression module CM1 for generating content of the compressed field H1'. Accordingly, the content of the field H1" substantially corresponds to the content of the redundant field H1.

Further, according to preferred embodiments of the present invention, since it has been assumed that the content of the redundant field H2 is univocally determined by the content of the redundant field H1, the decompression module DM-n generates the content of the field H2" by processing the content of the field H1". Accordingly, the content of the field H2" substantially corresponds to the content of the field H2.

Further, according to preferred embodiments of the present invention, the decompression module DM-n inserts a predefined value (e.g. 0) in the field H3". The content of the field H3" is therefore not necessarily equal to the content of the redundant field H3.

The decompression module DM-n then generates a decompressed packet P"n (which is shown in FIG. 6), which is formed by the decompressed header H" and the payload Pl.

The decompressed packets P"−1, P"n, P"n+1 are then sent to the switch S of the node N, which switches them according to information indicative of the packet destination which are comprised in the decompressed header H".

After the switching operation, the decompressed packets P"n−1, P"n, P"n+1 are then sent to the compression module CM-n comprised in the node N.

The operation of the compression module CM-n comprised in the node N is preferably similar to the operation of the compression module CM1 comprised in the first interface I1. In particular, the compression module CM1 preferably performs at least one of the following operations:

replacing the field H1" with the compressed field H1' whose size is lower than the size of H1", and mapping the content of the redundant field H1" into the compressed field H1';

deleting the field H2";

deleting the field H3".

Since the fields H1", H2" and H3" of the decompressed header H" correspond to the fields H1, H2 and H3 of the header H, respectively, compression performed by the compression module CM-n substantially recovers the compressed header H'.

The compression module CM-n then builds the compressed packet Pn' formed by the compressed header H' and the payload Pl.

Then, the transmitter TX-n sends the compressed packets P'n−1, P'n, P'n+1 to the second interface I2.

Figure 4:
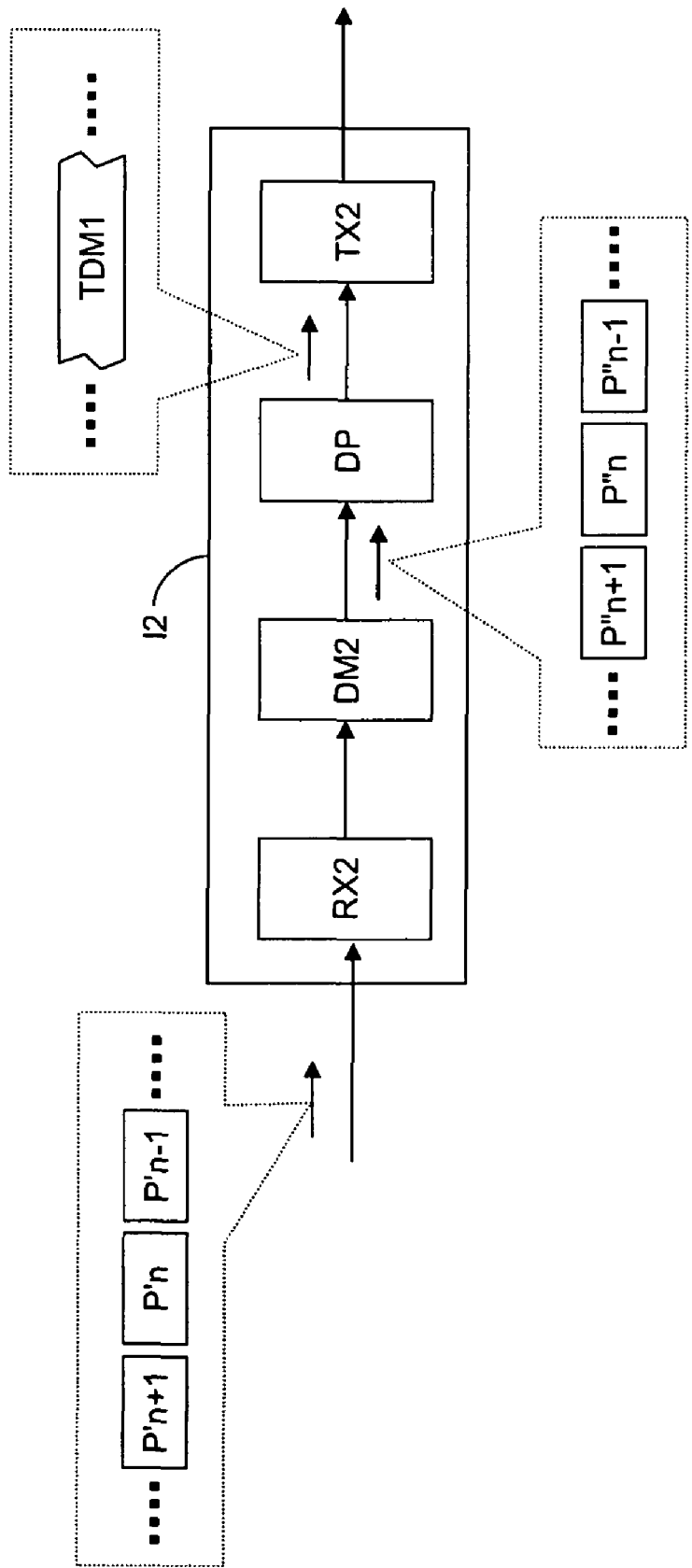
FIG. 4 shows in further detail the structure of the second interface of the telecommunication system of FIG. 1.

FIG. 4 shows in further detail the structure of the second interface I2. FIG. 4 only shows the modules suitable to process traffic transmitted from the first circuit-switched network CSN1 to the second circuit-switched network CSN2. For clarity of the Figure, the modules suitable to process traffic transmitted in the opposite direction are not shown in FIG. 4.

Preferably, the second interface I2 comprises a receiver RX2, a decompression module DM2, a depacketizer DP and a transmitter TX2.

A depacketizer is in charge of converting packets into TDM flow. A typical component for a depacketizer may be any digital programmable device such as for example the so-called Field Programmable Gate Array (FPGA) or a so-called Network Processor including a software that executes the depacketization.

A decompression module is in charge of decompressing certain compressed portions of the packet. In the context of the present description, a decompression module is in charge of decompressing the compressed header of the packet as will described in further detail below. A typical component for a decompressor may be any digital programmable device such as for example the so-called Field Programmable Gate Array (FPGA) or a so-called Network Processor including a software that executes the decompression.

When the receiver RX2 receives the compressed packets P'n−1, P'n, P'n+1 from the node N, the decompression module DM2 preferably processes each compressed packet P'n−1, P'n, P'n+1 thus generating a corresponding decompressed packet P"n−1, P"n, P"n+1. The operation of the decompression module DM2 preferably is substantially identical to the operation of the decompression module DM-n included in the node N. Accordingly, a detailed description will not be repeated.

The decompressed packets P"n−1, P"n, P"n+1 are then sent to the depacketizer DP which sorts them, extracts the payload bytes from their payloads and then recovers the TDM traffic flow TDM1.

Finally, the transmitter TX2 transmits the recovered TDM traffic flow TDM1 to the second circuit-switched network CSN2.

Therefore, advantageously, the method for implementing a circuit emulation service according to embodiments of the present invention advantageously allows to obtain at the same time both an acceptable transport efficiency and an acceptable transmission latency.

Indeed, thanks to the mechanism of compression-decompression described above, packets Pn−1, Pn, Pn+1 generated by the packetizer P are compressed in corresponding compressed packets P'n−1, P'n, P'n+1 having the same number of payload bytes but a reduced number of header bytes. Indeed, the compressed header advantageously does not comprise redundant information, since the redundant fields of the original header are either reduced in size (in case they have the above feature i)) or deleted (in case they have the above feature ii) and/or the above feature iii)). Accordingly, the compressed packets transport payload bytes with an increased transport efficiency in comparison to the packets generated by the packetizer. A numerical example of the increase in transport efficiency will be provided herein after, by referring to FIGS. 7a, 7b and 7c.

Compression of the header according to the present invention advantageously does not affect the packet-switch mechanism performed by the nodes of the packet-switched network. Indeed, the compression performed by the compression module at the first interface is substantially reversible, i.e. it is such that a decompression can be performed which allows to recover the information required to switch the packets across the packet-switched network and to recover the original TDM traffic flow at the second interface. The only information which can not be recovered is the content of the redundant fields having feature iii). Anyway, this does not affect the operation of the telecommunication system TS, since the content of such redundant fields is used neither by nodes of the packet-switched network for routing the packets towards the second interface, nor by the second interface for recovering the TDM traffic flow.

This advantageously allows to transmit the compressed packet and, at each node of the packet-switched network receiving the compressed packet, decompressing the packet (i.e. its header), switching the decompressed packet according to the information included in the decompressed header, and then compress again the packet (i.e. its header) before transmitting it towards either the next node or the second interface.

Hereinafter, an example of the method for implementing a circuit emulation service according to an embodiment of the present invention will be described in detail, in case the circuit emulation service to be implemented is the above cited CESoETH as defined by the standard MEF8.

Figure 7A:
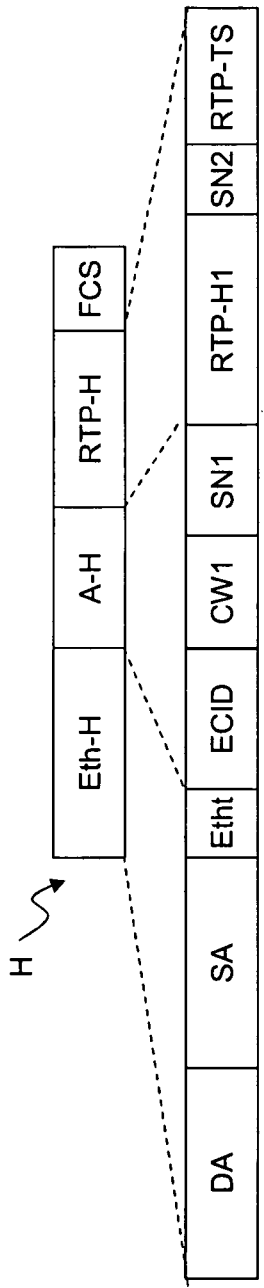
FIGS. 7a, 7b and 7c schematically show an example of the method according to embodiments of the present invention, in case of a CESoETH service.

FIG. 7a schematically shows a header H of a packet generated by the packetizer P according to the above standard MEF8. As mentioned above, the header H typically comprises an Ethernet service layer header Eth-H of 14 bytes, an adaptation header A-H of 8 bytes, an RTP header RTP-H of 12 bytes and a frame check sequence of 4 bytes. The overall size of the header H is 38 bytes.

The Ethernet service layer header Eth-H typically comprises a destination MAC address field DA (6 bytes), a source MAC address field SA (6 bytes) and an Ethernet type field Etht (2 bytes) which comprises a predefined value established by the standard MEF8 (i.e. 0×88d8), indicating that the Ethernet packet transports traffic associated to a CESoETH service.

The adaptation header A-H comprises an emulated circuit identifier field ECID (4 bytes). In particular, the first 20 bits of the field ECID are used to represent an identifier of the emulated circuit, which shall be unique for each emulated circuit supported by the packet-switched network PSN. The last 12 bits of the field ECID have a predefined value which is also established by the standard MEF8 (i.e. 0×102), and which is typically ignored by the second interface I2. Further, the adaptation header A-H comprises a field CW1 (2 bytes) comprising information indicative of the presence of a fault occurred externally to the packet-switched network, a fault type, a loss of frame, the presence of a multi-frame structure, the payload size, etc. Further, the adaptation header A-H comprises a sequence number field SN1 (2 bytes) comprising a sequence number identifying the packet. The sequence number included in the field SN1 allows the second interface I2 to restore the original sequence of packets, in order to recover the original TDM traffic flow.

The RTP header RTP-H comprises a further sequence number field SN2 (2 bytes) whose content, according to the standard MEF8, shall be equal to the content of the sequence number field SN1 of the adaptation header A-H. Further, the RTP header RPT-H comprises an RTP time stamp field RTP-TS (4 bytes) allowing the nodes of the packet-switched network PSN to switch packets substantially in real time. The remaining fields of the RTP header, which are generically indicated in FIG. 7a as RTP-H1, typically have predefined values.

It is noted that:
- the content of the destination MAC address field DA is univocally determined by the content of the emulated circuit identifier field ECID. Indeed, after the emulation circuit identifier has been assigned, the MAC destination address univocally depends from it, and it is equal to the MAC address of the second interface I2. Therefore, the destination MAC address field DA is a redundant field having feature ii);
- the content of the source MAC address field SA is used neither by the node N for switching packets, nor by the second interface I2 for recovering the original TDM traffic flow. Therefore, the source MAC address field SA is a redundant field having feature iii);
- the content of the Ethernet type field Etht has a predefined value. The Ethernet type field Etht is then a redundant field having feature ii);
- the emulated circuit identifier field ECID has a size higher than the size required to represent all the values that the emulated circuit identifier may assume. Indeed, the last 12 bits of this field have fixed value. Further, the first 20 bits of this field allow to represent $2^{20}$=1.048.576 different emulated circuit identifiers. However, the Applicant has noticed that typically a packet-switched network supports no more than about 250 emulated circuits. Therefore, the emulated circuit identifier field ECID is a redundant field having feature i);
- the content of the field CW1 is used neither by the node N for switching packets, nor by the second interface I2 for recovering the original TDM traffic flow. Therefore, the field CW1 is a redundant field having feature iii);
- the sequence number field SN1 may represent $2^{16}$=65.536 different sequence numbers. However, it is noted that, usually, at the reception side no more than about 250 packets have to be sorted according to the original sequence. Therefore, the sequence number field SN1 is a redundant field having feature i);
- the content of the fields RTP-H1 is used neither by the node N for switching packets, nor by the second interface I2 for recovering the original TDM traffic flow. Therefore, the fields RTP-H1 are redundant fields having feature iii);

the content of the further sequence number field SN2 is univocally determined by the content of the sequence number field SN1. The further sequence number field SN2 is then a redundant field having feature ii);

the RTP time stamp field RTP-TS may represent $2^{32}=4.294.967.296$ different time stamps. However, it is noted that usually real-time transport of the packets may be performed by using about 250 different time stamps. Therefore, the RTP time stamp field RTP-TS is a redundant field having feature i); and the content of the frame check sequence FCS is univocally determined by the content of the payload of the packet. Therefore, the frame check sequence FCS is a redundant field having feature ii).

Therefore, upon reception of an Ethernet packet including the header H of FIG. 7a, the compression module CM1 of the first interface I1 preferably generates a compressed header H' by performing at least one of the following operations:

deleting the destination MAC address field DA;
deleting the source MAC address field SA;
deleting the Ethernet type field Etht;
mapping the 4-byte emulated circuit identifier field ECID in a 1-byte compressed emulated circuit identifier field ECID';
deleting the field CW1;
mapping the 2-byte sequence number field SN1 in a 1-byte compressed sequence number field SN1';
deleting the fields RTP-H1;
deleting the further sequence number field SN2;
mapping the 2-byte RTP time stamp field RTP-TS in a 1-byte compressed RTP time stamp field RTP-TS';
deleting the frame check sequence FCS.

Figure 7B:
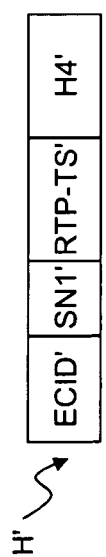

FIG. 7b shows the compressed header H' under the assumption that the compression module CM1 performs all the above operations and, in addition, it calculates a compressed header check sequence of 1 byte and inserts it in a further field H4' of the compressed header H'.

The compressed header has an overall size of 4 bytes.

Therefore, the number of header bytes required to transport e.g. 96 payload bytes is advantageously reduced from 38 (i.e. about 40% of the number of payload bytes) to 4 (i.e. about 4% of the number of payload bytes). Therefore, the transport efficiency is increased from about 0.71 to about 0.96, which is an acceptable value. Since the payload size is fixed to 96 bytes, the transmission latency is substantially unchanged, i.e. it is still equal to about 375 µs.

Figure 7C:
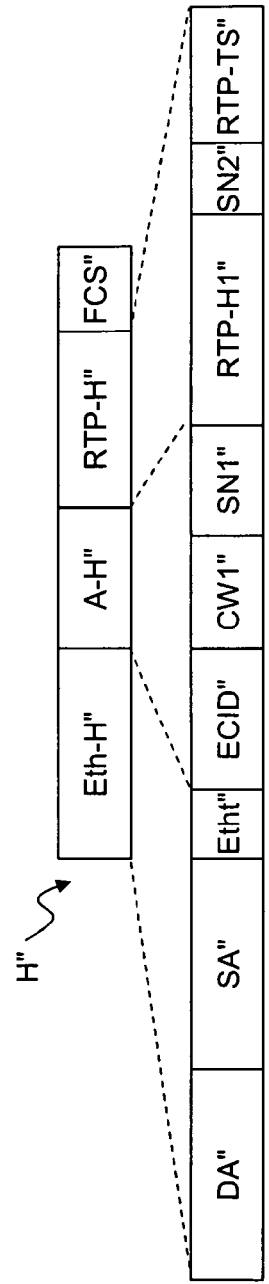

As mentioned above, the decompression module DM-n included in the node N is capable of decompressing the compressed header H' thus generating a decompressed header H'' corresponding to the original header H. In particular, the decompression module DM-n preferably performs the following operations:

generating a destination MAC address field DA'' and calculating its content according to the content of a decompressed emulated circuit identifier field ECID'' (see below);
generating a source MAC address field SA'' and setting its content to a predefined value (e.g. 0);
generating an Ethernet type field Etht'' and setting its content to the predefined value 0x88d8;
generating a decompressed emulated circuit identifier field ECID'' and calculating its content by demapping the content of the compressed emulated circuit identifier field ECID' to the first 20 bits of the field ECID'', and by setting the last 12 bits to the predefined value 0x102;
generating a field CW1'' and setting its content the a predefined value (e.g. 0);
generating a decompressed sequence number field SN1'' and calculating its content by demapping the content of the compressed sequence number field SN1';
generating fields RTP-H1'' and setting their content to their respective predefined values;
generating a further sequence number field SN2'' and setting its content equal to the content of the decompressed sequence number field SN1'';
generating an RTP time stamp field RTP-TS'' and calculating its content by demapping the content of the compressed RTP time stamp field RTP-TS'; and
calculating a check frame sequence FCS'' according to the content of the payload Pl:

The decompressed header H'' is shown in FIG. 7c. The content of the fields DA'', Etht'', ECID'', SN1'', SN2'', RTP-TS'' and FCS'' is equal to the content of the corresponding fields DA, Etht, ECID, SN1, SN2 RTP-TS and FCS, since it has been recovered either by demapping the content of a corresponding compressed field (as for ECID'', SN1'' and RTP-TS'') or by univocally determining it from the content of another field of the decompressed header (as for DA and SN2'') or of the payload (as for FCS''), or by fixing it to its predefined value (as for Eth''). On the contrary, the content of the fields SA'', CW1'' and RTP-H1'' may not be equal to the content of the corresponding fields SA, CW1 e RTP-H1, since the content of such fields, once deleted, can not be recovered. However, this does not affect the operation of the telecommunication system TS, since the content of such fields is used neither by the nodes of the packet-switched network for switching the packets, nor by the second interface for recovering the original TDM traffic flow.

It is to be noted that, where possible, the elements used for carrying out the invention can, where appropriate, include blocks which can be hardware devices, software modules or combination of hardware devices and software modules.

The method of the invention can be advantageously implemented on a network element, including means like an Application Specific Integrated Circuit (ASIC), a Field Programmable Gate Array (FPGA) and/or a microprocessor, and in a preferred embodiment through or together with a software process or software module including one or more software programs (computer programs) written in e.g. Very high speed integrated circuit Hardware Description Language (VHDL) or C or C++ or Java or another language, by one or more VHDL processes or C routines. Therefore, it is understood that the scope of the protection is extended to such a program and in addition to a computer readable means having a message therein, such computer readable storage means containing program code means for the implementation of one or more steps of the method, when this program is run on a computer, an ASIC, an FPGA or a microprocessor.

The various embodiments of the present invention may be combined as long as such combination is compatible and/or complimentary.

It is to be noted that the system of the invention can be used to practice another and materially different method and is not be construed to be limited to practicing only the method as claimed in the present invention. Likewise, the method of the invention can be practiced by another materially different system, device, apparatus or equipment than the one(s) claimed in the present invention as long as these are capable of performing the method of the invention.

The invention claimed is:

1. Method for implementing a circuit emulation service through a packet-switched network, said packet-switched network cooperating with a first interface and a second interface suitable to connect a first user and a second user, respectively, to said packet-switched network, said method comprising:
   a) at said first interface, receiving a TDM flow from said first user;
   b) converting said TDM flow in packets formatted according to said circuit emulation service, wherein at least one of said packets comprises a header in turn comprising a redundant field;
   c) compressing said header into a compressed header by processing said redundant field, and forming a compressed packet comprising said compressed header;
   d) transmitting said compressed packet through said packet-switched network to said second interface;
   e) at said second interface, receiving said compressed packet;
   f) decompressing said compressed header into a decompressed header and forming a decompressed packet comprising said decompressed header;
   g) processing said decompressed packet thus recovering said TDM flow; and
   h) transmitting said TDM flow to said second user,
      wherein said redundant field has a size higher than a minimum size required to represent all the values that the content of said redundant field assumes:
   said step c) comprises replacing said redundant field with a compressed field and mapping said redundant field into said compressed field; and
      said step f) comprises generating a first decompressed field corresponding to said redundant field and demapping said compressed field into said first decompressed field.

2. The method according to claim 1, wherein said step d) comprises:
   d1) receiving said compressed packet at a node of said packet-switched network;
   d2) at said node, decompressing said compressed header into said decompressed header and forming said decompressed packet comprising said decompressed header;
   d3) performing a packet-switch operation upon said decompressed packet;
   d4) at said node, compressing said decompressed header into said compressed header, and forming said compressed packet comprising said compressed header; and
   d5) transmitting said compressed packet.

3. The method according to claim 1, wherein said header comprises a second redundant field, and if said second redundant field has a predefined value:
   said step c) comprises deleting said second redundant field; and
   said step f) comprises generating a second decompressed field and setting said second decompressed field to a predefined value.

4. The method according to claim 1, wherein said header comprises a second redundant field, and if said second redundant field is unused by said packet-switched network and by said second interface:
   said step c) comprises deleting said second redundant field; and
   said step f) comprises generating a second decompressed field and setting said second decompressed field to a further predefined value.

5. A telecommunication system configured to implement a circuit emulation service, said telecommunication system comprising a packet-switched network, a first interface and a second interface cooperating with said packet-switched network, wherein said first interface comprises:
   a first receiver for receiving a TDM flow from a first user;
   a packetizer for converting said TDM flow in packets formatted according to said circuit emulation service, wherein at least one of said packets comprises a header in turn comprising a redundant field;
   a compression module for compressing said header into a compressed header by processing said redundant field, and forming a compressed packet comprising said compressed header; and
   a first transmitter for transmitting said compressed packet through said packet-switched network,
      wherein said redundant field has a size higher than a minimum size required to represent all values that the content of said redundant field assumes, and
      processing said redundant field comprises replacing said redundant field with a compressed field and mapping said redundant field into said compressed field.

6. The telecommunication system of claim 5 wherein said second interface comprises:
   a second receiver for receiving said compressed packet;
   a decompression module for decompressing said compressed header into a decompressed header and forming a decompressed packet comprising said decompressed header;
   a depacketizer for processing said decompressed packet thus recovering said TDM flow; and
   a second transmitter for transmitting said TDM flow to said second user.

7. The telecommunications system of claim 5, wherein said packet-switched network comprises a node, said node comprising:
   a third receiver for receiving said compressed packet;
   a further decompression module for decompressing said compressed header into said decompressed header and forming said decompressed packet comprising said decompressed header;
   a switch for performing a packet-switch operation upon said decompressed packet;
   a further compression module for compressing said decompressed header into said compressed header, and forming said compressed packet comprising said compressed header; and
   a third transmitter for transmitting said compressed packet.

8. A programmable device comprising non-transitory storage means with a software program recorded thereon, the software program comprising instructions which, when executed on the device, cause the device to carry out the steps of claim 1.

9. An interface for use in a telecommunication system, the telecommunication system configured to implement a circuit emulation service, said telecommunication system comprising a packet-switched network, wherein the interface is configured to cooperate with said packet-switched network, and wherein the interface comprises:
   a first receiver which receives a TDM flow from a first user;
   a packetizer which converts said TDM flow in packets formatted according to said circuit emulation service, wherein at least one of said packets comprises a header which comprises a redundant field;

a compression module which compresses said header into a compressed header by processing said redundant field, and forming a compressed packet comprising said compressed header; and a first transmitter which transmits said compressed packet through said packet-switched network, wherein said redundant field has a size higher than a minimum size required to represent all values that the content of said redundant field assumes, and processing of said redundant field comprises replacing said redundant field with a compressed field and mapping said redundant field into said compressed field.

* * * * *